US012694299B2

(12) United States Patent
Patil et al.

(10) Patent No.: US 12,694,299 B2
(45) Date of Patent: Jul. 28, 2026

(54) TRAINING A CONVOLUTIONAL NEURAL NETWORK

(71) Applicant: KONINKLIJKE PHILIPS N.V., Eindhoven (NL)

(72) Inventors: Meru Adagouda Patil, Bangalore (IN); Allmin Pradhap Singh Susaiyah, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 803 days.

(21) Appl. No.: 17/917,443

(22) PCT Filed: Apr. 6, 2021

(86) PCT No.: PCT/EP2021/058866
§ 371 (c)(1),
(2) Date: Oct. 6, 2022

(87) PCT Pub. No.: WO2021/204763
PCT Pub. Date: Oct. 14, 2021

(65) Prior Publication Data
US 2023/0153627 A1 May 18, 2023

(30) Foreign Application Priority Data
Apr. 7, 2020 (EP) ..................................... 20168453

(51) Int. Cl.
*G06N 3/086* (2023.01)

(52) U.S. Cl.
CPC ..................................... *G06N 3/086* (2013.01)

(58) Field of Classification Search
CPC ........ G06N 3/086; G06N 3/045; G06N 3/126; G06N 3/084
See application file for complete search history.

(56) References Cited

PUBLICATIONS

Huimei Han et al: "Convolutional neural network learning for generic data classification", Information Sciences, vol. 477, Mar. 1, 2019 (Mar. 1, 2019), pp. 448-465, XP055731 758, NL ISSN: 0020-0255, DOI: 10.1016/.ins.2018.10.053 (Year: 2018).*
International Search Report and Written Opinion for PCT/EP2021/058866; Mailing date: Jul. 2, 2021, 11 pages.
Han, H. et al., "Convolutional neural network learning for generic data classification", Information Sciences, vol. 477, pp. 448-465.

(Continued)

*Primary Examiner* — Pei Yong Weng

(57) ABSTRACT
A computer implemented methods and apparatus for use in training a convolutional neural network using a training data set. Each item of training data in the training data set comprises numerical data and a corresponding label for the respective numerical data. A method comprises, for each item of training data, converting the numerical data into a matrix, wherein elements in the matrix represent values of features in the numerical data. The method further comprises determining an arrangement for the numerical data in the matrices that decreases a similarity of matrices comprising numerical data with different labels, and/or increases a similarity of matrices comprising numerical data with the same labels, based on one or more measures of entropy.

11 Claims, 9 Drawing Sheets

(56)          References Cited

PUBLICATIONS

Klepetko, R. et al., "Analyzing CNN Model Performance Sensitivity to the Ordering of Non-Natural Data", 4th International Conference on Computing, Communications and Security (ICCCS), 2019, pp. 1-8.

"Large Scale Visual Recognition Challenge 2012 (ILSVRC2012)", retrieved from https://image-net.org/challenges/LSVRC/2012/results.html, 9 pages.

Goodfellow, I. et al., "Deep Learning", MIT Press, 2016, Abstract Only.

Susaiyah, A. et al., "Classification of indirect immunofluorescence images using thresholded local binary count features", Current Directions in Biomedical Engineering, 2016, vol. 2, No. 1, pp. 479-482.

* cited by examiner

For each item of training data, convert the numerical data into a matrix

202

Determine an arrangement for the numerical data in the matrices that decreases a similarity of matrices comprising numerical data with different labels, and/or increases a similarity of matrices comprising numerical data with the same labels, based on one or more measures of entropy

204

TRAINING A CONVOLUTIONAL NEURAL NETWORK

This application is the U.S. National Phase application under 35 U.S.C. § 371 of International Application No. PCT/EP2021/058866, filed on Apr. 6, 2021, which claims the benefit of European Application 20168453.7, filed Apr. 7, 2020. These applications are hereby incorporated by reference herein.

FIELD OF THE INVENTION

Embodiments herein relate to machine learning. Particularly but non-exclusively, embodiments herein relate to deep learning and training convolutional neural networks.

BACKGROUND OF THE INVENTION

This disclosure lies in the area of machine learning models and training a machine learning model to predict labels for data. Deep learning e.g. using deep neural networks has been playing an increasingly important role in object recognition and classification. The technique has proved to be good at prediction/forecasting tasks as well. The power of Deep-learning was illustrated in the IMA-GENET challenge of 2012 (see paper by Krizhevsky et al. entitled "Imagenet classification with deep convolutional neural networks"; Advances in neural information processing systems, pages 1097-1105, 2012.) In this challenge, a Convolution Neural Network (CNN) which is one form of deep-learning model, was trained on a vast corpus of training data comprising labelled images. Subsequently the trained model was tested on unlabelled data and it was found that this model achieved a top 5 test error rate of 15.31% (Top 5 error is the rate at which, given an image, the model does not output the correct label with its top 5 predictions). This was more than a 10% improvement compared to non deep-learning models. The next best entry in the challenge, that was not based on a deep-learning concept, achieved an error of 26.17% (the results of the IMAGENET challenge may be seen here: http://image-net.org/challenges/LSVRC/2012/results.html). One of the pre-requisites of deep learning is that supervised learning needs very large amount of training data. A rough rule of thumb is that a supervised deep learning algorithm will generally achieve acceptable performance with around 5,000 items of training data per label type (or category), and will match or exceed human performance when trained with a dataset containing at least 10 million labelled examples (see, I. Goodfellow, Y. Bengio, and A. Courville: "*Deep Learning*" MIT Press, 2016). However, for many applications, such large datasets may not readily be available. It is an object of embodiments herein to improve on such methods.

SUMMARY OF THE INVENTION

As described above large datasets are generally required to train a neural network in a supervised manner with no prior knowledge (e.g. to train newly initiated neural network that has random weights and biases).

Various techniques have been proposed for training neural networks on smaller data sets, such as for example, the technique known as Transfer Learning, whereby learning gained on one problem is applied to a similar problem. As an example, values of weights and biases of a neural network trained to identify cars in images may be used to initialize a neural network that is to be trained to recognize other types of road vehicles. Essentially therefore in this approach, an existing pre-trained model may be "adapted" by training it with new data.

As noted above, convolutional neural networks have been found to be very effective at predicting labels for images, however deep learning models are less well adapted to numeric data. It is an object herein to improve on known methods of predicting labels for numerical data, particularly where limited amounts of training data are available.

According to a first aspect there is a computer implemented method for use in training a convolutional neural network using a training data set, wherein each item of training data in the training data set comprises numerical data and a corresponding label for the respective numerical data. The method comprises, for each item of training data, converting the numerical data into a matrix, wherein elements in the matrix represent values of features or raw values in the numerical data. The method further comprises determining an arrangement for the numerical data in the matrices that decreases a similarity of matrices comprising numerical data with different labels, and/or increases a similarity of matrices comprising numerical data with the same (or similar) labels, based on one or more measures of entropy.

Thus according to embodiments here, the numerical data is converted into matrix (e.g. image) format such that it may be provided as input to a convolutional neural network. An arrangement for the numerical data is determined such that differences between training data having the same label are minimized, whilst differences between matrices comprising numerical data having different labels are accentuated. The fact that the arrangement is determined based on one or more measures of entropy is computationally efficient, compared to, for example, determining such an arrangement by trial and error, or monte carlo methods whereby all possible arrangements are considered. As will be described in detail below, the determined arrangement may then be applied to the training data and the arranged data may be used to train the neural network. In this manner, training data may be optimally arranged such that the learning of the convolutional neural network can be increased in scenarios where small numbers of training data are available (e.g. compared to presenting the data to the convolutional neural network in matrices comprising the same numerical data in other arrangements).

According to a second aspect there is a method of predicting a label for numerical data using a convolutional neural network. The method comprises converting the numerical data into a matrix, wherein the numerical data is arranged in the matrix according to a pre-determined arrangement that decreases a similarity of matrices comprising said numerical data type with different labels, and/or increases a similarity of matrices comprising said numerical data type with the same (or similar) labels based on one or more measures of entropy. The method then comprises providing the matrix as input to the convolutional neural network, wherein the convolutional neural network is trained to take as input matrices comprising numerical data arranged according to the pre-determined arrangement and output a label for such matrices.

According to a third aspect there is an apparatus for use in training a convolutional neural network using a training data set, wherein each item of training data in the training data set comprises numerical data and a corresponding label for the respective numerical data. The apparatus comprises a memory comprising instruction data representing a set of instructions, and a processor configured to communicate with the memory and to execute the set of instructions. The set of instructions, when executed by the processor, cause the processor to: for each item of training data, convert the numerical data into a matrix, wherein elements in the matrix represent values of features in the numerical data, and determine an arrangement for the numerical data in the matrices that decreases a similarity of matrices comprising numerical data with different labels, and/or increases a similarity of matrices comprising numerical data with the same labels, based on one or more measures of entropy.

According to a fourth aspect there is a computer program product comprising a computer readable medium, the computer readable medium having computer readable code embodied therein, the computer readable code being configured such that, on execution by a suitable computer or processor, the computer or processor is caused to perform the method of the first or second aspects.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION OF EMBODIMENTS

Figure 1:
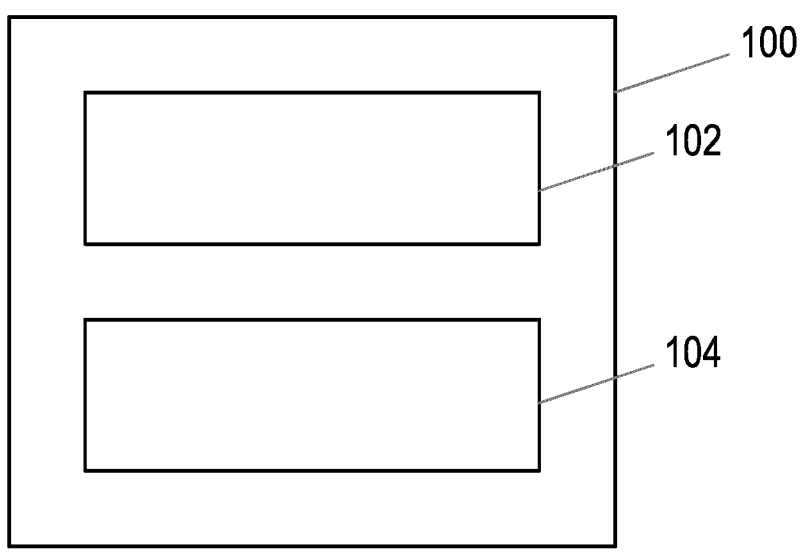
FIG. 1 shows an example apparatus according to some embodiments herein.

Turning now to FIG. 1 in some embodiments there is an apparatus 100 for use in training a convolutional neural network according to some embodiments herein. Generally, the apparatus may form part of a computer apparatus or system e.g. such as a laptop, desktop computer or other device, or the apparatus 100 may form part of the cloud/a distributed computing arrangement.

The apparatus comprises a memory 104 comprising instruction data representing a set of instructions and a processor 102 configured to communicate with the memory and to execute the set of instructions. Generally, the set of instructions, when executed by the processor, may cause the processor to perform any of the embodiments of the method 200 as described below. In some implementations, the set of instructions can comprise a plurality of software and/or hardware modules that are each configured to perform, or are for performing, individual or multiple steps of the method described herein.

Embodiments of the apparatus 100 may be for use in training a neural network using a training data set. Each item of training data in the training data set comprises numerical data and a corresponding label for the respective numerical data. More specifically, the set of instructions, when executed by the processor, cause the processor to, convert the numerical data into a matrix, wherein elements in the matrix represent values of features in the numerical data. The processor is further caused to determine an arrangement for the numerical data in the matrices that decreases a similarity of matrices comprising numerical data with different labels, and/or increases a similarity of matrices comprising numerical data with different labels, based on one or more measures of entropy.

The processor 102 can comprise one or more processors, processing units, multi-core processors or modules that are configured or programmed to control the apparatus 100 in the manner described herein. In particular implementations, the processor 102 can comprise a plurality of software and/or hardware modules that are each configured to perform, or are for performing, individual or multiple steps of the method described herein. The processor 102 can comprise one or more processors, processing units, multi-core processors and/or modules that are configured or programmed to control the apparatus 100 in the manner described herein. In some implementations, for example, the processor 102 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

The memory 104 is configured to store program code that can be executed by the processor 102 to perform the method described herein. Alternatively or in addition, one or more memories 104 may be external to (i.e. separate to or remote from) the apparatus 100. For example, one or more memories 104 may be part of another device. Memory 104 can be used to store the training data, the matrices and/or any other information or data received, calculated or determined by the processor 102 of the apparatus 100 or from any interfaces, memories or devices that are external to the apparatus 100. The processor 102 may be configured to control the memory 104 to store the training data, the matrices and/or the other information.

In some embodiments, the memory 104 may comprise a plurality of sub-memories, each sub-memory being capable of storing a piece of instruction data. For example, at least one sub-memory may store instruction data representing at least one instruction of the set of instructions, while at least one other sub-memory may store instruction data representing at least one other instruction of the set of instructions.

It will be appreciated that FIG. 1 only shows the components required to illustrate this aspect of the disclosure and, in a practical implementation, the apparatus 100 may comprise additional components to those shown. For example, the apparatus 100 may further comprise a display. A display may comprise, for example, a computer screen, and/or a screen on a mobile phone or tablet. The apparatus may further comprise a user input, such as a keyboard, mouse or other input device that enables a user to interact with the apparatus, for example, to provide initial input parameters to be used in the method described herein. The apparatus 100 may comprise a battery or other power supply for powering the apparatus 100 or means for connecting the apparatus 100 to a mains power supply.

Figure 2:
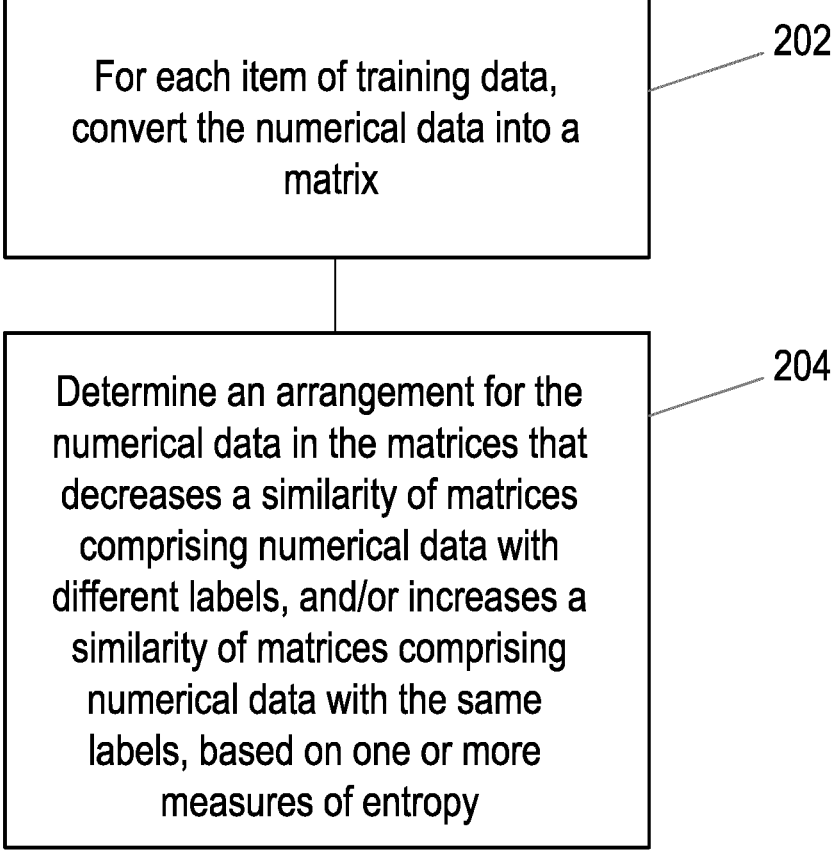
FIG. 2 shows an example method according to some embodiments herein.

Turning to FIG. 2, there is a computer implemented method 200 for use in training a convolutional neural network using a training data set. Each item of training data in the training data set comprises numerical data and a corresponding label for the respective numerical data. Embodiments of the method 200 may be performed, for example by an apparatus such as the apparatus 100 described above.

Briefly, in a first step 202, the method 200 comprises: for each item of training data, converting the numerical data into a matrix, where elements in the matrix represent values of features in the numerical data. In a second block 204 the method 200 comprises determining an arrangement for the numerical data in the matrices that decreases a similarity of matrices comprising numerical data with different labels, and/or increases a similarity of matrices comprising numerical data with different labels, based on one or more measures of entropy or similar techniques.

Thus there is provided a method 200 for use in training a convolutional neural network to predict a label for numerical data. The method 200 advantageously formats or arranges the data into a format that better brings out the differences between numerical data examples of different types (e.g. with different labels) and/or reduces differences between numerical data with the same label. This makes it easier for the convolutional neural network (CNN) to correctly label new, unseen, data based on fewer training examples, because the training examples are presented in an optimized format for CNN learning.

In more detail, the convolutional neural network (CNN) may comprise any neural network having a convolutional behavior. The CNN may be configured to take any dimensional data as input. For example, the CNN may take as input one-dimensional, two-dimensional or three-dimensional data.

The skilled person will be familiar with neural networks, but in brief, neural networks are a type of supervised machine learning model that can be trained to predict a desired output (e.g. ground truth label) for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights and biases associated with the neurons are adjusted until the optimal weightings are found that produce predictions for the training examples that reflect the corresponding ground truth labels. Convolutional neural networks are a type of neural network comprising one or more layers that represent a convolution operation. They have the advantage of learning from special relationship of data such as from local textures and patterns. Examples, of CNNs include but are not limited to LeNet, AlexNet, VGG-16, VGG-19, GoogLeNet, ResNet, U-net, Y-net and F-net. They have the ability to perform various tasks ranging from Image Classification, Object Detection, Image Enhancement, Anomaly Detection and Semantic Segmentation. They have been growingly popular and have been accepted as the most advanced technique for realizing Artificial Intelligence.

The training data set comprises training data items (e.g. rows or pieces of training data). Each training data item comprises numerical data and one or more corresponding labels for the numerical data. In other words each item of training data comprises an example input to the CNN and the ground truth output (label) for that example input.

The numerical data in the training data set may comprise numerical data of any type (e.g. the method is not restricted to any particular type of data). Generally the method may be applied to training data sets where there is limited training data available. In other words where the training data set is relatively small. As an example, a data set may be considered small if it comprises fewer than 5000 items of training data per label type (see I. Goodfellow, Y. Bengio, and A. Courville: *"Deep Learning"* MIT Press, 2016). In some examples the number of items of training data in the data set may be insufficient to train a CNN with an accuracy above a predetermined (e.g. desired) threshold accuracy. A predetermined threshold accuracy may be, for example, an accuracy of 95 percent, 90 percent, 80 percent, or any other desired accuracy level.

In some examples, the method may be applied to training data sets comprising data skewness, e.g. whereby a data set comprises many examples of numerical data with some labels and fewer examples of numerical data with other labels.

In some embodiments the numerical data may comprise numerical output by a machine, system or other device. As an example, the numerical data may be extracted from log data for the machine, system or other device. The label may comprise a ground truth indication of whether the machine is likely to fail within a predetermined time frame. In this way, the method may be used to train a convolutional neural network to predict system failures in machines, e.g. based on a low number of training data examples.

As such, in some examples, the numerical data may comprise one-dimensional (1D) numeric data, comprising parameters associated with the running of a device, such as operational data, run stats, performance indicators, etc. The numerical data may comprise, for example, one-hot encoded categorical data, numerical data representing a machine's physical parameters such as voltage, current, etc and/or numerical readings from one or more sensors.

Examples of devices comprise, for example, medical devices, machines (such as electric machines) used in manufacturing, outputs from vehicles, airplanes, boats, or any other type of machine, device or system that outputs numerical data.

Examples of medical devices include, but are not limited to medical imagers (such as magnetic resonance imaging MRI scanners, CT scanners, x-ray machines, ultrasound scanners, or any other scanning equipment). Other examples include, but are not limited to heart-rate monitors and/or emergency care equipment. Thus methods herein may be used to predict failure of medical apparatus, e.g. based on limited data of previous failures.

In an example trial related to healthcare machines, in the case of failure of one particular critical component of an example type of system, the number of failures observed were on the order of a few hundred (~200) failures for a period of three years across data collected for all connected installed systems (~6000 system connected systems). However, a huge number of training examples of "good cases" (e.g. no failure) for the same type systems was obtained over the same time period (close to 65 lakh data points). This is an example of a training data set with data skewness. Data skewness is traditionally handled by either taking same number of data points for both good and bad cases or by using machine learning techniques such as synthetic minority over-sampling. However this could leave a training data set with insufficient examples of both "good" and "imminent failure" data. As noted above, this may be overcome in embodiments herein by optimizing the training data so that improved learning may be obtained with a smaller training data set.

In another example, the numerical data may comprise patient data, such as patient vital signs, including but not limited to patient blood pressure, temperature, breathing rate etc. In such an example, the corresponding label (ground truth classification) may comprise, for example, an indication of patient health or a treatment outcome. In this manner, the methods and systems herein may be used to predict patient healthcare outcomes for small datasets.

In another example, the numerical data may comprise transactional data such as data related to e-commerce transactions. For example, the numerical data may comprise examples of purchases made by an individual, frequency of purchases, transaction amount etc. In such an example, the corresponding label (ground truth classification) may comprise, e.g. the next purchase made by the individual, the next purchase amount, or the number of purchases made by the same individual over an upcoming period. In this manner, the methods and systems herein may be used to predict consumer behavior for customers where limited data is available.

The skilled person will appreciate that these are merely examples and that many other types of training data are also contemplated.

Turning back to FIG. 2, in step 202, the method comprises, for each item of training data, converting the numerical data into a matrix or grid/array format, wherein elements in the matrix represent or comprise values of features in the numerical data. As used herein, an image is an example of a matrix. For example, in some embodiments, converting the numerical data into a matrix may comprise representing the numerical data as a two-dimensional image or a three-dimensional image. Examples of image formats that the numerical data may be converted into include, but are not limited to, jpeg, png, DICOM and FITS image formats.

More generally, the numerical data may be converted into any format that may be processed by a CNN as described above.

In some examples, converting the numerical data into a matrix comprises representing each feature in the numerical data as a column or a row of elements in the corresponding matrix or image. In one embodiment, one dimensional data is transposed (e.g. converted) to represent a two-dimensional (2D) image. This can be done by placing each parameter reading as one column or row and placing each parameter value adjacent to one another. In such a scenario, if there are n parameters then there are $n*(n-1)$ ways of arranging the columns or rows of parameters. Embodiments herein may be used to determine an optimal arrangement (e.g. from the $n*(n-1)$ possible arrangements) for the features in the matrix.

Figure 5:
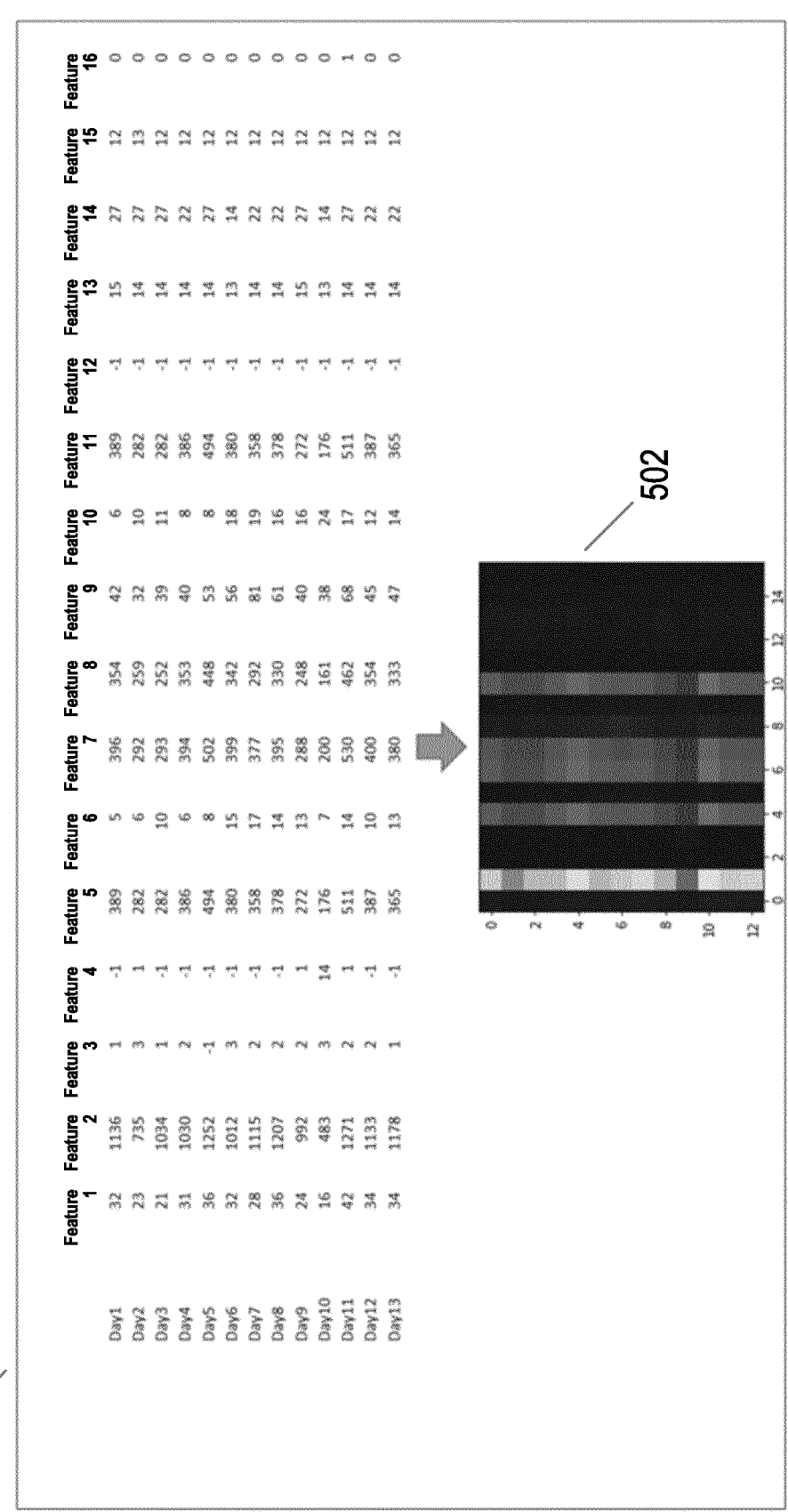
FIG. 5 shows an example item of input data and an example image that the input data is converted into.

FIG. 5 illustrates an example embodiment showing an item of training data 502 from a training data set comprising numerical data representing log data output from a healthcare device over a period of 13 days. The columns represent different features or fields of log data and the rows represent the different days. In this embodiment, in step 202, the numerical data is converted into a two-dimensional image 504 where each feature in the numerical data is represented as a column of pixels in the two dimensional image.

Turning back to FIG. 2, in step 204, the method comprises determining an arrangement for the numerical data in the matrices that decreases a similarity of matrices comprising numerical data with different labels, and/or increases a similarity of matrices comprising numerical data with the same (or similar) labels, based on one or more measures of entropy.

In this context an arrangement may comprise, for example, an order of the rows or columns in the data, e.g. a position that each feature should be, relative to other features in the matrix. Thus in some embodiments, the step of determining an arrangement for the numerical data in the matrices may comprise determining an order (or an appropriate re-ordering) for the columns or rows of numerical data in the matrices.

As noted above, an arrangement is determined that decreases a similarity of matrices comprising numerical data with the different labels, and/or increases a similarity of matrices comprising numerical data with different labels, e.g. compared to a random arrangement of the features in the columns or rows of the matrix.

In other words, entropy is determined i) between matrices comprising numerical data with different labels and ii) matrices comprising numerical data with the same labels, for different arrangements (e.g. column orderings) of the matrices. An arrangement is then chosen that optimizes (e.g. increases) the entropy between matrices comprising numerical data with different labels and optimizes (e.g. reduces) the entropy between matrices comprising numerical data with the same labels.

In this context, similarity, may comprise a measure of variability or mutual information. E.g. an arrangement may be determined that decreases a measure of variability or mutual information of matrices comprising numerical data with the same labels, and/or increases a variability or measure of mutual information of matrices comprising numerical data with different labels.

Put another way, the determined arrangement may result in a training data set comprising matrices (or images) where the intraclass mutual relationship and the interclass difference are both maximised.

The measures of entropy in step 204 may thus comprise any measure of similarity, variability, or mutual information between two matrices (e.g. images).

In some embodiments, the step of determining an arrangement for the numerical data may comprise using a machine learning method to determine the arrangement. For example, in some embodiments, the step of determining an arrangement for the numerical data in the matrices may comprise using a machine learning method to determine a transformation that increases a measure of entropy between matrices comprising numerical data with different labels and/or using a machine learning method to determine a transformation that decreases a measure of entropy between matrices comprising numerical data with the same labels.

Examples of machine learning methods that may be used for this purpose include, but are not limited to genetic algorithm methods, or information gain methods.

Generally a transformation may be applied that represents a re-ordering of the columns in the matrices. The transformation may be of the form $$X' = X \prod_{k=1}^{n!} E_k{}^{\varphi_k},$$

wherein X comprises a matrix, X' comprises a transformed matrix, $E_K$ comprises a column transformation matrix of rank n, and $\varphi_k \in \{0,1\}$ comprises a binary parameter. In other words, X may comprise an initial (e.g. randomly selected) arrangement of features in the matrix, X' may represent the determined arrangement for the numerical data as determined in step 204 and $E_K$ comprises a column transformation that can be applied to data arranged in the initial or starting arrangement in order to obtain the optimal arrangement.

This formula therefore shows how the column transformation takes place. E1, E2, E3 . . . En are elementary matrices. Each of the $E_K$ performs one column interchange when any matrix X is multiplied with it. For example, E1 interchanges column 1 and column 2 of X, E13 interchanges column 3 and 6 of X. There are n! possibilities of E, each interchanging two columns. The selected column transformation $E_K$ is chosen by optimizing $\varphi$ (as described below).

Put more formally, the best feature order (columns) is obtained when the mutual relationship between two neighboring feature attributes/columns is maximum and the difference between the classes in maximum. In one embodiment, each matrix (or converted image) is defined as 2D represented time series data (2DTRS), However the underlying data may or may not be time series in nature. Let $X \in \mathbb{R}^{m \times n \times p}$ be the feature matrix containing 2DRTS of C data classes with elements $x_{ijk}$ where m is the number of elements across one axis, n is the number of elements across another axis and p is the number of observations. Let $X_c \in \mathbb{R}_{m \times n \times p_c}$ be the matric containing pc samples belonging to class c. When feature is reordered along the attribute axis, the sample matrices X and Xc are transformed into X' and X'c respectively by the following rules:

$$X' = X \prod_{k=1}^{n!} E_k^{\varphi_k}$$

$$X'_c = X_c \prod_{k=1}^{n!} E_k^{\varphi_k}$$

where Ek is the column transformation matrix also known as elementary matrix obtained from interchanging two columns of the identity matrix of rank n, $\varphi_k \in \{0,1\}$ is the binary parameter that decides the influence of the elementary matrix Ek in reordering the feature matrix.

X is the complete feature matrix (all time duration, all features, all samples). Xc contains only those samples of X which belong to class C (all time duration, all features, all samples of class C only). This demonstrates that the reordering the columns is independent of the class. In some embodiments, the parameter $\varphi_k \in \{0,1\}$ is determined by optimising a fitness function, the fitness function comprising a first term for increasing an intra-label (or intra-class) similarity (e.g. the similarity of matrices having the same label) of the numerical data represented by the matrices in the training data set and/or a second term for decreasing an inter-label (or inter-class) similarity (e.g. the similarity of matrices having different labels) of the numerical data represented by the matrices in the training data set.

In some embodiments, the fitness function comprises a first term representing an intra-label (or intra-class) similarity (e.g. the similarity of matrices having the same label) of the numerical data represented by the matrices in the training data set and a second term representing an inter-label (or inter-class) similarity (e.g. the similarity of matrices having different labels) of the numerical data represented by the matrices in the training data set. The fitness function is optimized with respect to intra-label similarity (which should be maximized) and inter-label similarity (which should be minimized).

In some embodiments, the parameter $\varphi_k$ e $\{0,1\}$ is optimized based on a fitness function, G, of the form:

$$G(\Phi^*) = \sum_{w=1}^{n-1} M(x'_{iwk}, x'_{i(w+1)k}) + \frac{1}{2} \sum_{c1=1}^{C} \sum_{c2=1}^{C} D(X_{c1}', X_{c2}') + \sum_{k=1}^{n!} -\varphi_k,$$

wherein M comprises a measure of the entropy between matrices having the same label, and D comprises a measure of the entropy of between matrices having different labels (e.g. different classes, c1 and c2, where C is the set of possible classes). Put another way, M is a function that measures the mutual relationship between the distribution of two quantities. D is a function that measures the local interclass differentiability of the feature vectors of two classes or labels (interclass difference). The last term is a regularization term that minimizes the number of transformation. As noted above, the parameter $\Phi = \{\varphi_k : k \in \mathbb{N}, k \leq n!\}$ can be learnt through various techniques such as genetic algorithm, information gain etc.

In this equation, x' is the same X' above, but it is flattened. Which means it is no longer a matrix, but a vector. In other words, x' is a flattened version of the complete feature matrix (all time duration, all features, all samples). x' is one column, and w+1 is its adjacent column. Thus the term M (x'$_{iwk}$, x'$_{i(w+1)k}$) represents the mutual relationship between adjacent columns (w and w+1) across the column dimension.

$X_{c1}'$ represents X' belonging to class C1. $X_{c2}'$ represents X' belonging to class C2. Thus the term $D(X_{c1}', X_{c2}')$ represents the interclass differentiability between each class of data in the dataset.

Computation of (M)—Maximization of intraclass mutual relation: In some embodiments, Jumarie's Negative Entropy of joint histogram may be used to compute this metric. Entropy is a measure of uncertainty in a distribution. If the two columns are mutually related, then the uncertainty decreases, ie. entropy decreases. Therefore, negative entropy increases. Joint distribution of the two columns can be computed and its entropy can be measured. The optimization will require maximization of the negative entropy. The entropy measure might approach optimality even if both columns are zero valued. To prevent this and give more weightage to distributions having non zero values, the mutual information measure is used. This methodology uses entropy with mutual information to achieve feature/temporal data reordering to maximize interclass mutual relation.

It is noted that adjacent columns change when reordering occurs. Therefore M (mutual information) is computed between two different pairs of columns during each iteration. For example: let 12345 be the original column order. In one iteration, the reordered columns are 15243. The intraclass mutual information (M) compares columns 1vs5, 5vs2, 2vs4 . . . . In next genetic iteration, the order may become: 13542 Now, M compares columns 1vs3, 3vs5, 5vs4, . . . mHence, M is dependent on the order of the columns.

This is merely an example however and the skilled person will appreciate that the similarity measure, M, may comprise or be based on other measures including but not limited to: i) a Stuctural Similarity Index; ii) inverse Distance measures such as Eucledian, Manhattan, or Mahalanobis; iii) Kullback-Leibler divergence; or iv) Statistical Significance testing. Generally, M may be any feature that represents how similar two distributions are.

Computation of (D)—Maximization of interclass difference: In some embodiments, an Entropy of a histogram of thresholded local binary count (LBC) pattern features may be used to maximize the interclass difference. Local binary count (LBC) is a measure computed for each pixel in the image. Thus, for a 256×256 image, we get a 256×256 LBC image. In some embodiments, the histogram of this image may be computed. This histogram is called a histogram of thresholded local binary count pattern features, or a Histogram of an LBC Image. The Entropy of this histogram may be used for the parameter D. Further information on LBC may be found in the paper by Susaiyah, Pathan & Swaminathan, 2016 entitled: "*Classification of indirect immunofluorescence images using thresholded local binary count features*". The thresholded local binary count features are directional and noise invariant improvement of Local binary pattern (LBP) features. It calculates the local LBP values on thresholded image and counts the number of ones in it instead of converting to decimal representation.

This is merely an example however and in other embodiments, D may be calculated, for example, using techniques such as a Local Binary Pattern, or Local Ternary Pattern. Generally, D quantifies how different the images of two classes are.

Once the step 204 is completed and an arrangement is determined, the arrangement may be applied to the training data set. For example, the method 200 may further comprise arranging the numerical data in each matrix of each item of training data, according to the determined arrangement. This may comprise, for example, applying a transformation, determined above to each matrix determined in step 202. The method may then comprise training the convolutional neural network, based on the arranged matrices and the respective labels, to predict labels for previously unseen numerical data, wherein the previously unseen numerical data is provided to the neural network in the determined arrangement.

In some embodiments, the arranged data may be either fed to a newly created deep-learning architecture or fed to existing CNN based deep-learning model for transfer learning. Not all processed data is necessarily used for model building, for example, a subset of the training data set may be left unused for model creation and used for model validation instead. Based on the validation result the data goes for further processing with respect to replacing missing values or with respect to rearrangement of rows/columns of the data. The process may become cyclic in nature (e.g. with sequential epochs of training), the training cycle may be completed when the CNN meets an acceptable accuracy in validation phase.

Once trained in this manner, the trained CNN may be used to predict a label for new (previously unseen) numerical data. For example, in some embodiments, there may be a method of predicting a label for numerical data using a convolutional neural network. Such a method may comprise converting the numerical data into a matrix, wherein the numerical data is arranged in the matrix according to a pre-determined arrangement (e.g. such as the arrangement determined in step 204 of the method 200) that decreases a similarity of matrices comprising said type of numerical data with different labels, and/or increases a similarity of matrices comprising said type of numerical data with different labels based on one or more measures of entropy. The method may then comprise providing the matrix as input to the convolutional neural network, wherein the convolutional neural network is trained to take as input matrices comprising numerical data arranged according to the pre-determined arrangement and output a label for such matrices.

Figure 3:
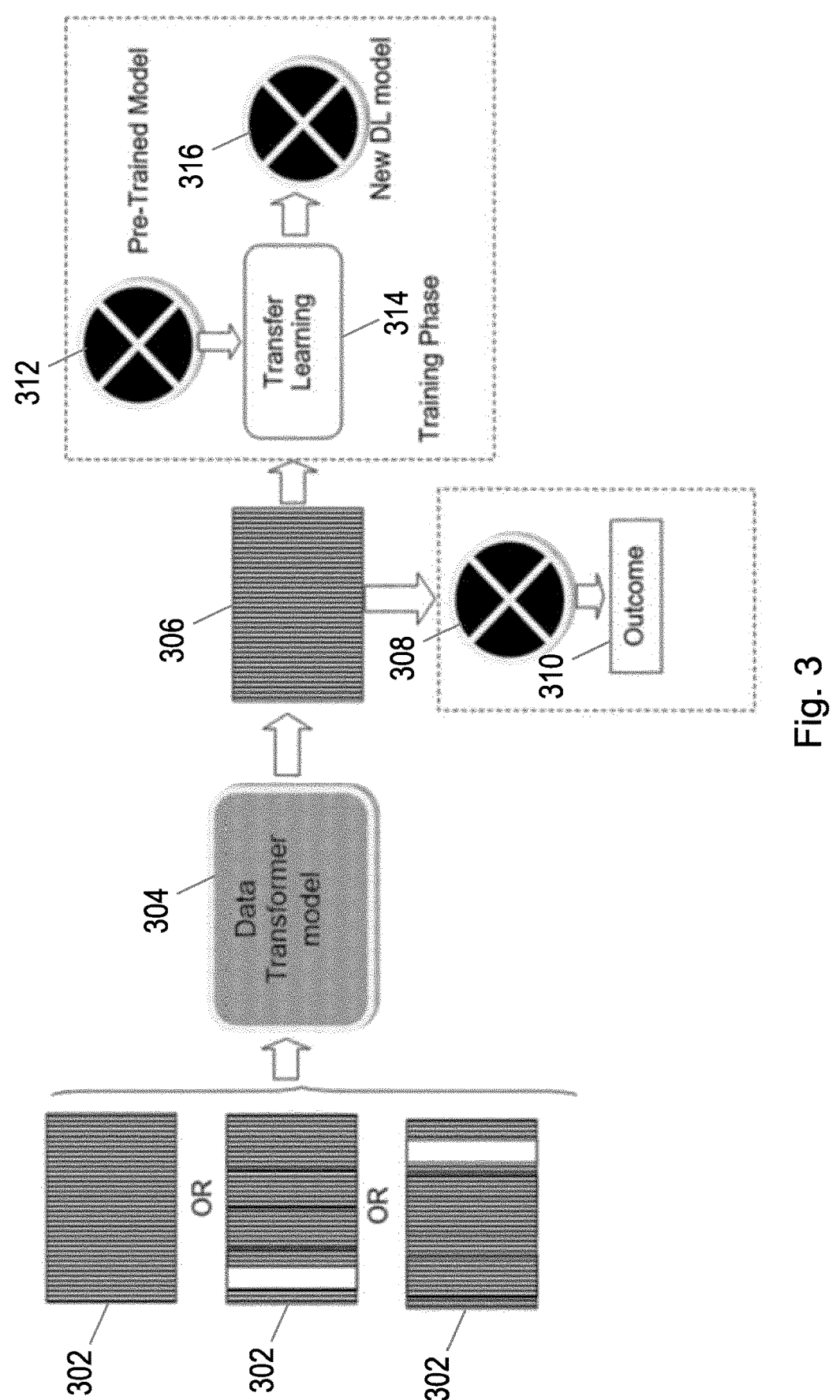
FIG. 3 illustrates an example method according to some embodiments herein.

Turning now to other embodiments, FIG. 3 illustrates an embodiment of the method 200 as described above. In this embodiment, a training data set comprising numerical data and a corresponding label for each item of training data is processed using the method 200. In step 202, for each item of training data in the training data set, the numerical data is converted into a matrix in the form of an image 302. The converted images are passed to a data transformer model or module 304. The data transformer model 304 determines an arrangement for the numerical data in the matrices that decreases a similarity of matrices comprising numerical data with different labels, and/or increases a similarity of matrices comprising numerical data with the same (or similar) labels, based on one or more measures of entropy, according to step 204 above.

The arrangement determined by the data transformer model 304 is applied to the numerical data in the training data set. This arranged data set can then be used to train a CNN model directly (e.g. to train a new CNN model 308) to produce a trained CNN model 310. Alternatively, the arranged data can be used in a transfer learning operation whereby the training 314 is performed on a CNN 312, the CNN 312 having been previously trained for a similar or related task. In this way an updated model 316 is produced.

In this way, the data transformer model 304 can be used to generate a training data set comprising matrices of numerical data that are ordered in a manner that is optimized or best suited for deep-learning based model training. The "Data Transformer Model" 304 takes any type of input (as shown with three different type of images 302) and rearranges the columns such that the rearranged images 306 is best suited for transfer learning task or acts as best image during scoring phase.

Figure 4:
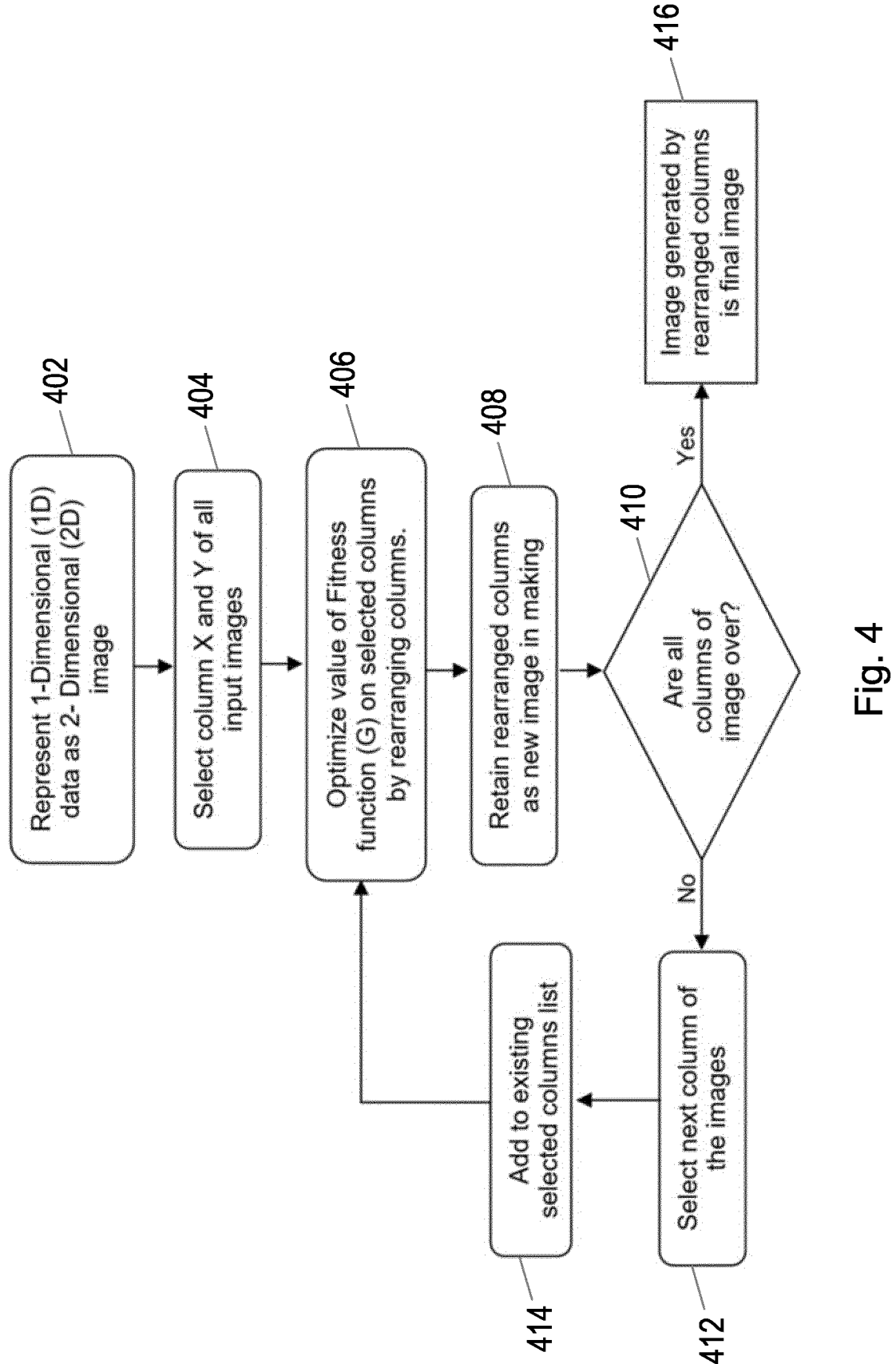
FIG. 4 illustrates an example method according to some embodiments herein.

FIG. 4 illustrates a method performed by the data transformer model 304 according to some embodiments herein. As noted above, in this embodiment, the numerical data is 1D, and so the first step 402 comprises, according to step 202 above, converting each 1D numerical data item into a matrix in the form of a 2D image. In this embodiment, columns of elements in the 2D images represent features in the numerical data.

In this embodiment, in step 204, determining an arrangement for the numerical data in the 2D images, comprises the following: In step 404 a pair of columns, X and Y are selected. Columns X and Y are interchanged in step 406 and (new/temporary) images are created using the new column order, for all images in the training data set. G is computed 406 for this arrangement, and checked to see if it is optimized. If the arrangement it optimized, then this is used. If not, then the original image is rearranged by switching another pair of columns, X and Y (e.g. step 404 is repeated for a different selection of X and Y). All possible arrangements may be considered, for example, by determining whether all columns have been considered (for rearrangement) 410 and selecting new pairs of columns, X, Y for rearrangement 412. Combinations of X and Y that have been tried already may be added to a list 414. Once all possible combinations of X and Y have been considered the method may terminate at 416.

In other words, in some embodiments, step 204 may comprise the following:
1) The Genetic Algorithm suggests an order for the columns.
2) For a given an order of columns $c_1$, $c_2$, $c_3$, $c_4$ . . . $c_N$, where X and Y are adjacent columns. Ex:
   a. in the first step 404, X=$c_1$, Y=$c_2$
   b. In second step X=$c_2$, Y=$c_3$ c. . . .

d. In last step X=cN−1, Y=cN

3) Fitness function considers all the XY and

4) Repeat steps 404-406 until the genetic algorithm reaches a predefined criteria for its convergence. The criteria for convergence may comprise, for example, a number of iterations that should be completed or a validation of performance.

In summary, in the embodiment illustrated in FIG. 4, the "Data Transformer Model" 304 selects two or more columns of the images and applies a mathematical technique of rearranging the columns in each image so that there is greater intra-class matching and greater inter-class separability of data, this is defined as Fitness function (G) as defined above. This process is continued until all the columns of given images are considered for the computation of Fitness function (G).

Turning now to FIGS. 5-7, as noted above, in some embodiments, the method 200 may be applied to training data comprising log data output by a machine such as an item of healthcare equipment. In such an example, the training data may comprise the log data (e.g. numerical data) and a label for each item of log data that is a ground truth classification of whether the system will continue to run in good state in the next N days (classed as "Good Pool") or there is possibility of observing failure of the device in next N days ("Bad Pool"). Example log data 502 and an example of how the log data is converted or represented as a 2D image 504 is illustrated in FIG. 5.

Figure 6A:
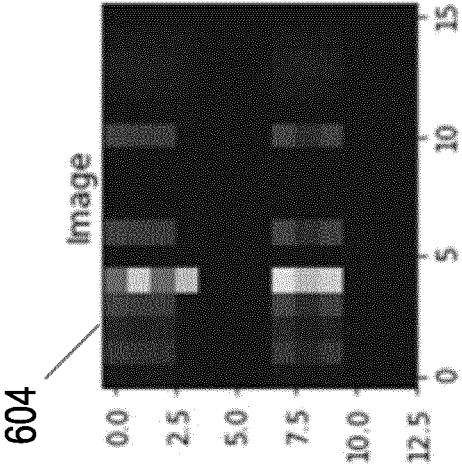
FIG. 6*a* illustrates two different examples of training data with two different labels.
Figure 6A:
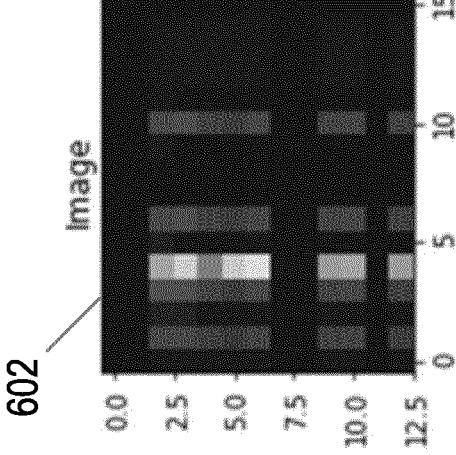
Figure 6B:
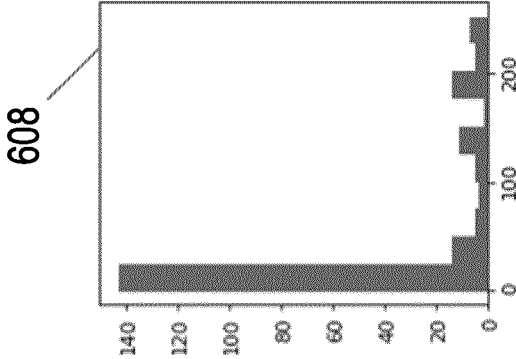
FIG. 6*b* illustrates histograms of the example training data shown in FIG. 6*a;*
Figure 6B:
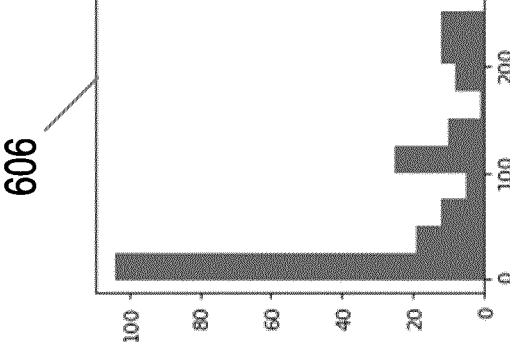

FIG. 6a illustrates examples of training data items classified as "Bad Pol" 602 and "Good Pol" 604 respectively for a small dataset of the order of a few hundred training data examples. The columns of numerical data in FIG. 6a is ordered in a random order. This data was directly used to train an existing deep-learning model using a transfer learning procedure. The resulting trained model was validated on numerical data arranged in the same way, and it was found to predict the labels "Good Pool" and "Bad Pool" with an accuracy of 56%. This accuracy level can be attributed to the fact that both "Bad Pool" and "Good Pool" images look very similar. The histogram patterns of the images 602 and 604 are illustrated in FIG. 6b in histograms 606 and 608 respectively. In other words, with this random ordering of the features in the numerical data, the data is too similar for the CNN to be able to accurately predict the "Good Pool" and "Bad Pool" labels.

Figure 7A:
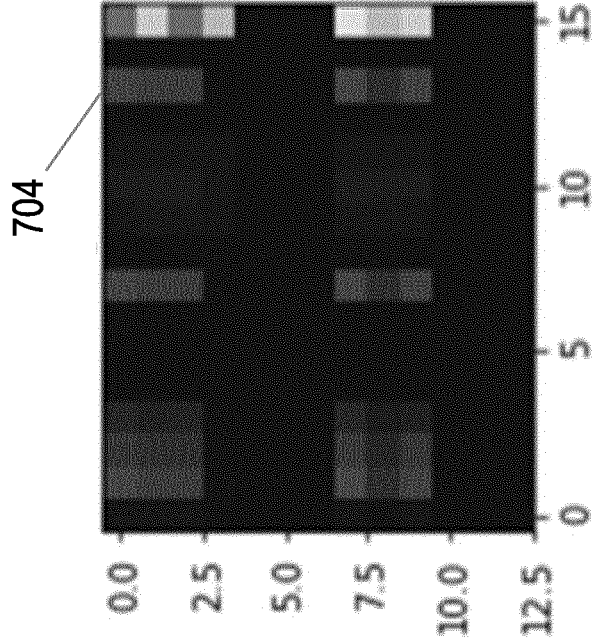
FIG. 7*a* shows the same example images as FIG. 6*a,* rearranged according to an arrangement determined according to some embodiments herein.
Figure 7A:
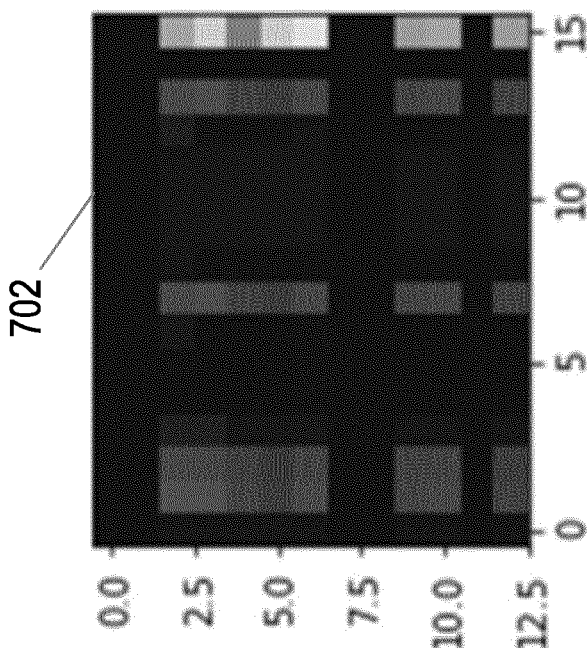
Figure 7B:
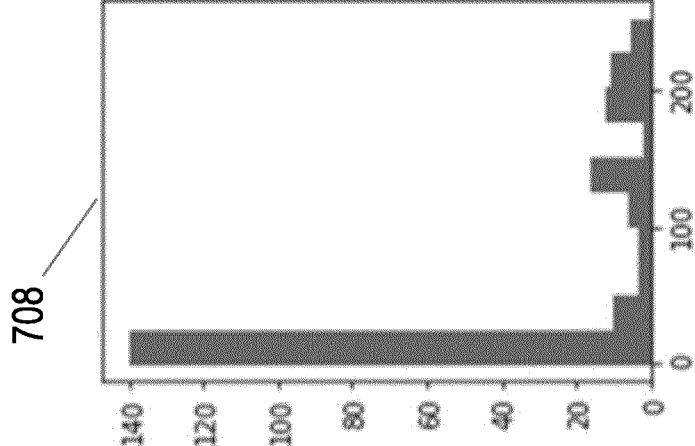
FIG. 7*b* illustrates histograms of the rearranged data examples in FIG. 7*a.*
Figure 7B:
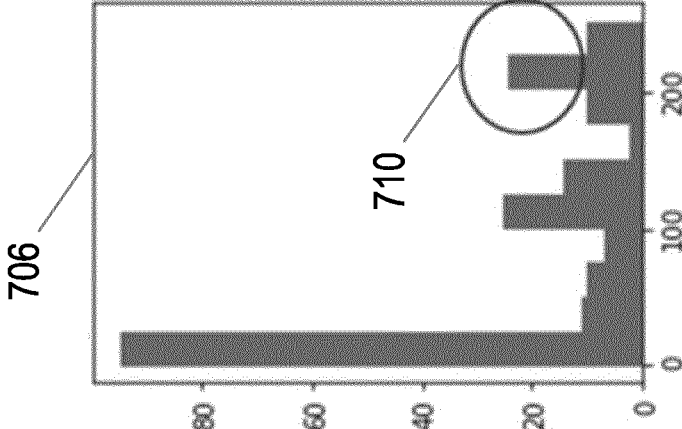

However when same data is processed using "Data Transformer Model" 304, an arrangement for the columns is found, as shown in FIG. 7a whereby image 702 illustrates the rearranged version of image 602 and the image 704 illustrates the rearranged version of 604. It is evident from the new images that are generated by reordering the columns according to the output of the data transformer model 304, that there is a difference in visual appearance between the new images classed as "good pool" 704 and "bad pool" 702. This is further evident when histogram of the new images are considered, as shown in FIG. 7b which shows histograms of the images 702 and 704 in histograms 706 and 708 respectively. From histograms 706 and 708, it can be seen that in the "bad pool" data there is a peak post 200 (highlighted with the circle 710) however, in this data set, the same peak is missing in the rearranged "good pool" data 708. This leads to the increase in inter-class difference as optimized by the "Data Transformer Model" 304. When the dataset was rearranged according to the determined arrangement and used in a transfer learning procedure, to train a CNN (and subsequently validate the model), it was found, that for this dataset, the model yielded accuracy of 72%, which is 16% more than if images were used without processing by "Data Transformer Model".

Thus, in this manner, an improvement in the accuracy of a CNN can be obtained by determining an optimal arrangement or format for the inputs to the CNN, according to embodiments herein.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein. Such as, for example, any of the embodiments of the method 200 and/or the methods illustrated in FIGS. 3 and 4.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or apparatus may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for use in training a convolutional neural network using a training data set, wherein each item of training data in the training data set comprises numerical data and a corresponding label for the respective numerical data, comprising:

for each item of training data, converting the numerical data into a matrix, wherein elements in the matrix represent values of features in the numerical data;

determining an arrangement for the numerical data in the matrices that decreases a similarity of matrices comprising numerical data with different labels, and/or increases a similarity of matrices comprising numerical data with the same labels, based on one or more measures of entropy, wherein determining comprises using a machine learning method to: (i) determine a transformation that decreases a measure of entropy between matrices comprising numerical data with the same labels, and/or (ii) determine a transformation that increases a measure of entropy between matrices comprising numerical data with different labels;

arranging the numerical data in each matrix of each item of training data, according to the determined arrangement; and training the convolutional neural network, based on the arranged matrices and the respective labels, to predict labels for previously unseen numerical data, wherein the previously unseen numerical data is provided to the neural network in the determined arrangement.

2. The method of claim 1, wherein the step of converting the numerical data into a matrix comprises representing each feature in the numerical data as a column or a row of elements in the corresponding matrix.

3. The method of claim 1, wherein the step of converting the numerical data into a matrix comprises representing the numerical data as a two-dimensional image or a three-dimensional image.

4. The method of claim 1, wherein the step of determining an arrangement for the numerical data in the matrices comprises determining an order for the columns or rows of numerical data in the matrices.

5. The method of claim 1, wherein the machine learning method comprises at least one of a genetic algorithm method, or an information gain method.

6. The method of claim 1, wherein the step of determining an arrangement for the numerical data in the matrices comprises determining a transformation of the form:

$$X' = X \prod_{k=1}^{n!} E_k^{\varphi k},$$

wherein X comprises a matrix, X' comprises a transformed matrix, $E_K$ comprises a column transformation matrix of rank n, and $\varphi_k \in \{0,1\}$ comprises a binary parameter.

7. The method of claim 6, wherein the parameter $\varphi_k \in \{0, 1\}$ is determined by optimizing a fitness function, the fitness function comprising a first term for increasing an intra-label similarity of the numerical data represented by the matrices in the training data set and/or a second term for decreasing an inter-label similarity of the numerical data represented by the matrices in the training data set.

8. The method of claim 6, wherein the parameter $\varphi_k \in \{0, 1\}$ is optimized based on a fitness function, G, of the form:

$$G(\Phi^*) = \sum_{w=1}^{n-1} M\left(x'_{iwk}, x'_{i(w+1)k}\right) + \frac{1}{2} \sum_{c1=1}^{C} \sum_{c2=1}^{C} D(X'_{c1}, X'_{c2}) + \sum_{k=1}^{n!} -\varphi_k$$

wherein M comprises a measure of the entropy between matrices having the same label, and D comprises a measure of the entropy of between matrices having different labels.

9. The method of claim 1, wherein the numerical data comprises data output by a machine, and wherein the label comprises a ground truth indication of whether the machine is likely to fail within a predetermined time frame.

10. An apparatus for use in training a convolutional neural network using a training data set, wherein each item of training data in the training data set comprises numerical data and a corresponding label for the respective numerical data, comprising:

a processor configured to communicate with a memory having instruction data representing a set of instructions and to execute the set of instructions, wherein the set of instructions, when executed by the processor, cause the processor to:

for each item of training data, convert the numerical data into a matrix, wherein elements in the matrix represent values of features in the numerical data;

determine an arrangement for the numerical data in the matrices that decreases a similarity of matrices comprising numerical data with different labels, and/or increases a similarity of matrices comprising numerical data with the same labels, based on one or more measures of entropy, wherein determining comprises using a machine learning method to: (i) determine a transformation that decreases a measure of entropy between matrices comprising numerical data with the same labels, and/or (ii) determine a transformation that increases a measure of entropy between matrices comprising numerical data with different labels;

arrange the numerical data in each matrix of each item of training data, according to the determined arrangement; and train the convolutional neural network, based on the arranged matrices and the respective labels, to predict labels for previously unseen numerical data, wherein the previously unseen numerical data is provided to the neural network in the determined arrangement.

11. A non-transitory computer program product comprising a computer readable medium, having computer readable code embodied therein, the computer readable code being configured such that, on execution by a processor, the processor is caused to perform the method as claimed in claim 1.

\* \* \* \* \*